United States Patent [19]

Partridge et al.

[11] 4,000,034

[45] Dec. 28, 1976

[54] KRAFT MILL RECOVERY SYSTEM

[75] Inventors: Harold deVere Partridge, Wilson; Willard A. Fuller, Grand Island, both of N.Y.

[73] Assignee: Hooker Chemicals & Plastics Corporation, Niagara Falls, N.Y.

[22] Filed: Aug. 15, 1975

[21] Appl. No.: 605,093

[52] U.S. Cl. .................. 162/30 K; 162/DIG. 8; 210/21; 261/113
[51] Int. Cl.² .................................. D21C 11/06
[58] Field of Search .......... 162/17, 29, 30, DIG. 8; 423/190, 199, 206, 207, 422, 551, 499; 210/21; 23/270 R; 261/113

[56] References Cited

UNITED STATES PATENTS

| 3,130,016 | 4/1964 | Grier | 4/64 |
|---|---|---|---|
| 3,243,318 | 3/1966 | Mihara et al. | 261/113 |
| 3,309,177 | 3/1967 | Goerg | 23/270 R |
| 3,367,735 | 2/1968 | Hanway et al. | 423/199 |
| 3,800,026 | 3/1974 | Morgan | 423/499 |
| 3,801,370 | 4/1974 | Porter et al. | 23/270 R |
| 3,833,462 | 9/1974 | May et al. | 162/29 |

FOREIGN PATENTS OR APPLICATIONS

| 233,878 | 5/1925 | United Kingdom | 261/113 |

*Primary Examiner*—S. Leon Bashore
*Assistant Examiner*—Peter F. Kratz
*Attorney, Agent, or Firm*—Peter F. Casella; William J. Crossetta, Jr.

[57] ABSTRACT

An improved process for the treatment, separation, and utilization of precipitator catch wherein treated precipitation catch is separated by countercurrent washing in a column.

6 Claims, 1 Drawing Figure

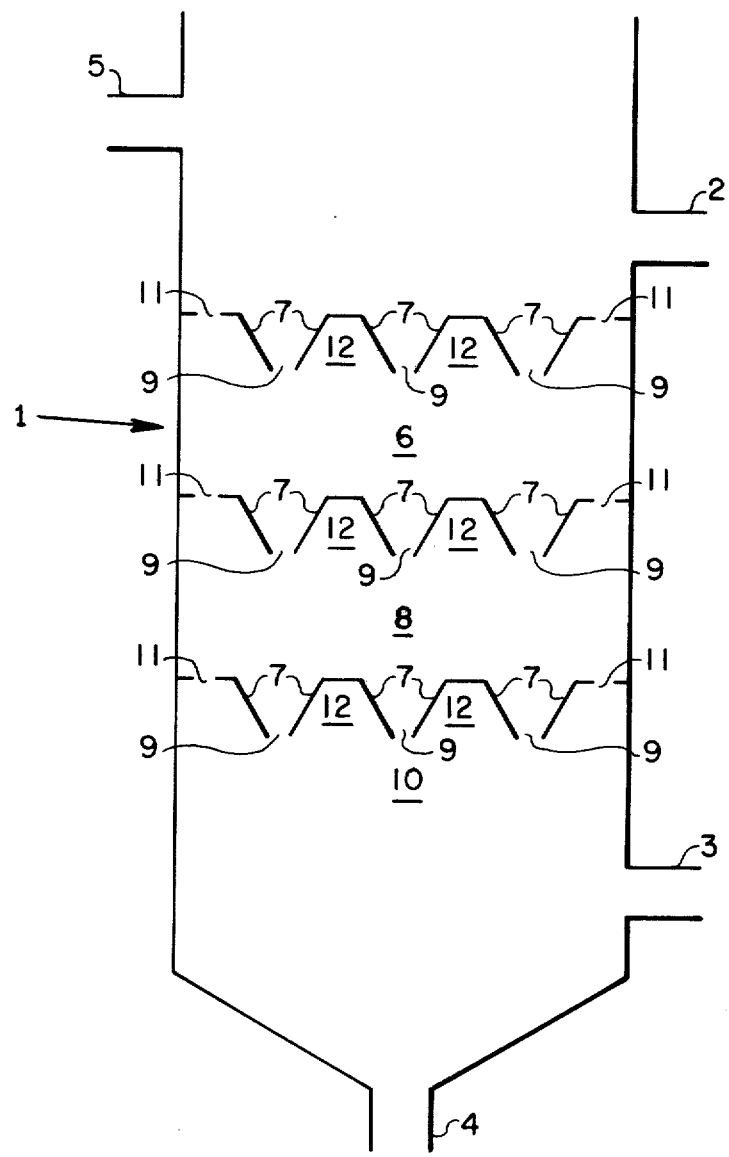

KRAFT MILL RECOVERY SYSTEM

The present invention relates to kraft pulping processes. More particularly, the present invention relates to reduction of losses in kraft pulping processes.

In the conventional kraft pulping processes currently used for the production of cellulosic fibrous pulp materials, lignocellulosic material is pulped with what is termed as "white liquor" containing sodium hydroxide and sodium sulfide which serve to degrade lignin, hemicelluloses and other non-cellulosic materials to soluble components. The cellulosic fiber which remains is separated from the "black liquor" resulting from the treatment, which black liquor is subsequently processed for the recovery and recycling and/or discard of the constituents.

In the recovery system, the black liquor is concentrated by evaporation and then reacted in a "recovery boiler" to yield a smelt, primarily sodium carbonate and sodium sulfide, the smelt then dissolved in water to produce "green liquor" which, on the addition of lime becomes white liquor, with the sodium carbonate converted to sodium hydroxide. The calcium carbonate precipitate is removed from the white liquor and calcined to regenerate lime. The white liquor is then recycled to pulp additional lignocellulosic material.

The problem associated with the presence of sodium chloride in kraft liquor, introduced into the pulp mill by logs that have absorbed salt water during transport, are well-known to coastal pulp mills. Generally, in the past, sodium chloride has been primarily viewed in relationship to corrosion; however, more recently improvements in and demands upon emission controls have resulted in substantial increases in the level of sodium chloride in the liquors. During pulping operations, sodium chloride is dissolved in the pulping liquor and tends to remain in the chemical recovery cycle. Such sodium chloride represents a dead load since it is inactive in the kraft pulping process, and also reduces the capacity of the recovery boiler due to limits generally established on the solids content and the rate of feed of the black liquor into the recovery boiler.

Mills located in the interior or those supplied with logs which have not been salt water transported do not generally face this problem now; however, in the future, reuse of water to limit discharge of pollutants from a kraft mill may result in a significant buildup of sodium chloride in the recovery system, as for example, the recycling of bleach plant effluent. In such systems, chlorine and chlorine dioxide are pulp bleaching agents which are ultimately reduced to the chloride ion during the bleaching process, with the bleach plant effluent normally sewered. However, the effluent can also be used to effect washing of the pulp prior to bleaching and, in this manner, the bleach plant effluent would eventually add to the recovery boiler, adding sodium chloride to the chemical recovery load.

During the regeneration of pulping chemicals in the recovery boiler of conventional chemical recovery systems some solid material is contained in the water vapor and carbon dioxide gaseous emission from the recovery furnace or boiler, with the solid material normally recovered by the use of an electrostatic precipitator ("precipitator catch"), and contains sodium sulfate and sodium carbonate which can be recycled to the recovery boiler.

As set forth hereinbefore, the problems associated with sodium chloride buildup presently in pulping mills is generally caused by the use of logs towed or stored in salt water. A number of reports have been written on sodium chloride buildup in kraft pulping mills, with possible solutions offered for its removal. One such proposal would utilize the preferential solubility of sodium chloride as a means for leaching the sodium chloride from the precipitator catch or dust in a salt enriched liquor. However, such a system results in the dissolution and loss of sodium sulfate values and may result in a buildup of greater than about 40 percent by weight of solids in the slurry, which concentration generally is too high for conventional handling equipment. Additionally, any sodium carbonate contained in the precipitator catch may be dissolved during the leaching operation.

It has recently been proposed to convert the sodium carbonate to sodium sulfate by adding to the leached precipitator catch sufficient sulfuric acid to render the medium acidic, and filtering the leached slurry to provide a solid cake phase of anhydrous sodium sulfate and a liquid phase enriched in sodium chloride, and separating the solid and liquid phases by conventional filtrate procedures. While such system represents an improvement in the handling and removal of dead load sodium chloride, certain disadvantages are inherent in such recovery technique, e.g. increased costs and maintenance problems with filter operation, and more importantly, less efficient separation of sodium chloride and sodium sulfate values by commercial filtration devices and techniques.

It is an object of the present invention to provide an improved process for the separation of dead load sodium chloride and sodium sulfate values obtained as precipitator catch in pulp mill operations.

In accordance with the present invention, precipitator catch containing sodium sulfate, sodium carbonate, sodium chloride and organic materials, leached with aqueous, dilute sulfuric acid to convert the sodium carbonate to sodium sulfate and to produce a slurry containing undissolved solids and an acidic pH, generally about 3–6, is fed to the top of a separatory column, described in detail hereinafter, hot water at a temperature of from about 30° to about 70° C. is added continuously via an inlet countercurrent flow to the downward flow of slurry, with the crystals contained in the downward flowing slurry continuously washed by the hot water, sodium chloride removed via an outlet located near the top of the separatory column, and sodium sulfate and organic materials removed as a slurry via an outlet near the bottom of the column.

Such process permits of simple, efficient and economic removal of dead load sodium chloride while maximizing the recovery of useful sodium sulfate values.

The sodium chloride-containing slurry removed from the top of the separatory column may be sewered, fed to a single vessel chlorine dioxide generator system or the like.

The sodium sulfate slurry removed from the bottom portion of the separatory column may be recycled to the recovery system, to the recovery furnace where the sodium sulfide and sodium carbonate produced are removed to a green liquor system, with the organics burned in the recovery furnace.

In operation, the temperature of the admixture in the column is maintained, as stated, at from about 30° to about 70° C., preferably from about 30° to about 40° C.

The rates of continuous flow of hot water and catch slurry are adjusted so as to provide maximum washing and separatory efficiency without producing substantial losses of sulfate values in the sodium chloride slurry removed from the top of the column, generally from about 0.2 to about 4 pounds and preferably about 0.2 to about 2.0 pounds of water per each pound of sodium sulfate are introduced into the separatory column.

FIG. 1 is illustrative of the separatory column which is advantageously employed in the process of the present invention. The apparatus is a separatory column or tower 1 made of any suitable construction materials, such as for example, titanium, plastics, ceramics, or the like. The column is preferably, although not necessarily, substantially cylindrical having an inlet means 2 at the upper portion thereof for the introduction of the acid treated precipitator catch from a slurry tank (not shown). The lower portion of the column is provided with a hot water inlet 3 and a sodium sulfate slurry takeoff means 4. The upper portion of the column is provided with a sodium chloride slurry takeoff means 5. Column 1 is divided into multiple treatment zones 6, 8, 10, etc. by plates incorporating multiple downwardly tapering funnel-shaped configurations 7 having openings 9 at the apex for discharging treated catch slurry downward into turbulent washing zones 6, 8, 10 etc. the flow of solids-containing slurry directed downwardly from plate to plate, and succeeding turbulent washing zones.

Each plate is provided with multiple aperatures 11 located at or near the junction of the uppermost portion of the plate and the column wall. As the treated catch slurry moves downward onto the plate and through the opening 9, the upcoming flow of hot water is diverted in part through openings 11, setting up a circulatory flow around and in the funnel shaped configuration, creating turbulence in the zones immediately below the openings 9, continuously washing the catch, washing sodium chloride upward for removal via outlet 5 and continuously permitting the downward passage of sodium sulfate for removal via outlet 4. Control of the downward flow of the catch and the extent of the turbulence is conveniently effected by adjusting the relative sizes of the openings 9 and 11.

Zone 12 of the apparatus is a relatively non-turbulent zone wherein the solids of the catch slurry settle by gravity and are not carried by rising liquid to the washing zone above.

The column may be located immediately below the slurry tank in which instance the acid treated catch slurry moves by gravity flow from the slurry tank (not shown) into the column via inlet 2. In those instances where space and other factors dictate the placement of the column at a site adjacent to or remote from the slurry tank, the catch slurry is pumped by suitable pumping means (not shown) to the column via inlet 2.

The total number of plates situated in the column may be varied, depending generally upon the size of the precipitator, amounts of catch to be handled in a given time period, space considerations. Generally, in operations where standard pulping precipitator units are used, columns of about 10–15 feet in length, 2–3 feet in diameter having 8–12 plates situated approximately 1 foot apart are suitable.

As stated, the sodium sulfate recovered can be recycled to the recovery furnace. Alternately, the recovered sodium sulfate can be fed into a separate recovery boiler and reduced to sodium sulfide, which can then be re-used in the pulping process, removed for use in other applications, or converted to hydrogen sulfide by carbonation with a source of carbon dioxide, e.g., lime kiln gas, with the hydrogen sulfide oxidized to sulfuric acid which can be utilized in chlorine dioxide generation.

The sulfuric acid used in treating the precipitator catch may be fresh sulfuric acid, although spent sulfuric acid from a chlorine dioxide generator may be used.

The composition of a typical precipitator catch obtained in coastal kraft mills contains from about 45 to 75 percent sodium sulfate, 15 to 40 percent sodium chloride, 0.1 to 20 percent sodium carbonate and 1–12 percent organics. The major determining factor for sulfuric acid consumption in the sulfuric acid treatment is the sodium carbonate content, 0.92 pounds of sulfuric acid are required to convert 1 pound of sodium carbonate to sodium sulfate, with the organics consuming about 0.1 to 0.15 pounds of sulfuric acid per pound of organic matter.

Sufficient aqueous sulfuric acid is added to the precipitator catch to convert the carbonate and to react with the organics present, with the pH on the acid side about 3–6. The slurry is mixed for a time, generally less than about 30 minutes, and at a temperature, generally less than about 65° C., to effect treatment, and the resultant slurry added to the separatory column as hereinbefore described, preferably on a continuous basis.

Utilizing the sulfuric acid treatment of precipitator catch wherein separation is effected by standard filtration techniques, the sodium sulfate filter cake contains as much as 15 percent unseparated sodium chloride, with a loss of about 1 pound sodium sulfate per 3 – 4.5 pounds sodium chloride in the filtrate.

Utilizing the separatory technique of the present process essentially all of the sodium chloride is separated from the sodium sulfate, with insignificant amounts of sodium sulfate removed over head with the sodium chloride.

What is claimed is:

1. In the process for the pulping of lignocellulosic material wherein
   a. lignocellulosic materials are cooked with pulping liquor;
   b. the pulping liquor is evaporated and combusted;
   c. inorganic and organic solids mixed with the combustion gases are precipitated as precipitator catch containing sodium sulfate, sodium chloride, sodium carbonate and organic material;
   d. said sodium carbonate is converted to sodium sulfate with aqueous sulfuric acid at a pH of from about 3 to about 6 to produce a treated precipitator catch slurry containing sodium sulfate, sodium chloride and organic material;

the improvement which comprises
   passing said treated precipitator catch slurry into the top of a separatory column, in a downward flow;
   countercurrently passing hot water upwardly through said column at a rate sufficient to effect washing of the downwardly flowing slurry;
   removing said sodium chloride from the top of said separatory column; and
   removing said sodium sulfate and organic material from the bottom of said separatory column.

2. The process as defined by claim 1 wherein the process is a continuous process.

3. The process as defined by claim 1 wherein the temperature of the hot water is maintained at from about 30° to about 70° C.

4. The process as defined in claim 1 wherein the hot water is fed into the separatory column at a rate sufficient to provide from about 0.2 to about 4 pounds of water per each pound of sodium sulfate.

5. The process of claim 4 wherein said rate provides from about 0.2 to about 2.0 pounds of water per pound of sodium sulfate.

6. The process of claim 1 wherein said separatory column contains multiple plates incorporating therein multiple downwardly tapering funnel-shaped configurations for discharging slurry downward into turbulent zones and multiple apertures near the junction of the column wall allowing upward flow of water.

* * * * *

UNITED STATES PATENT OFFICE
CERTIFICATE OF CORRECTION

PATENT NO. : 4,000,034
DATED : December 28, 1976
INVENTOR(S) : Harold deVere Partridge and Willard A. Fuller It is certified that error appears in the above-identified patent and that said Letters Patent are hereby corrected as shown below:

Column 2, line 45, "inlet countercurrent" should read ---inlet located near or at the bottom of the separatory column in countercurrent---.

Signed and Sealed this

Fifth Day of April 1977

[SEAL]

Attest:

RUTH C. MASON
Attesting Officer

C. MARSHALL DANN
Commissioner of Patents and Trademarks